United States Patent
Alken et al.

(10) Patent No.: US 10,449,582 B2
(45) Date of Patent: Oct. 22, 2019

(54) ROLL ASSEMBLY FOR ROLLS IN A ROLLING MILL

(71) Applicant: SMS Group GmbH, Duesseldorf (DE)

(72) Inventors: Johannes Alken, Siegen (DE); Ralf Seidel, Dillenburg (DE)

(73) Assignee: SMS GROUP GMBH, Duesseldorf (DE)

( * ) Notice: Subject to any disclaimer, the term of this patent is extended or adjusted under 35 U.S.C. 154(b) by 610 days.

(21) Appl. No.: 15/038,799

(22) PCT Filed: Nov. 11, 2014

(86) PCT No.: PCT/EP2014/074256
§ 371 (c)(1),
(2) Date: May 24, 2016

(87) PCT Pub. No.: WO2015/078688
PCT Pub. Date: Jun. 4, 2015

(65) Prior Publication Data
US 2017/0157656 A1   Jun. 8, 2017

(30) Foreign Application Priority Data
Nov. 26, 2013   (DE) .................. 10 2013 224 117

(51) Int. Cl.
 B21B 27/02    (2006.01)
 B21B 31/07    (2006.01)
 (Continued)

(52) U.S. Cl.
 CPC ............ *B21B 27/02* (2013.01); *B21B 31/074* (2013.01); *B21B 31/078* (2013.01); *F16C 13/00* (2013.01);
 (Continued)

(58) Field of Classification Search
 CPC ................ F16C 33/1045; F16C 33/105; F16C 2320/23; B21B 31/074; B21B 31/02;
 (Continued)

(56) References Cited

U.S. PATENT DOCUMENTS 2,161,768 A * 6/1939 Smitmans ............. B21B 31/074
 384/151
3,259,442 A * 7/1966 Boghosian ............ B21B 31/078
 384/480

(Continued)

FOREIGN PATENT DOCUMENTS

DE  19831301   1/2000

OTHER PUBLICATIONS

Oil-Film Bearings for Rolling Mills, © American Society of Lubrication Engineers, 1967, pp. 51-59.

*Primary Examiner* — Gregory D Swiatocha
(74) *Attorney, Agent, or Firm* — Abelman, Frayne & Schwab

(57) ABSTRACT

To increase the load-carrying capacity or rolling capacity of a roll assembly in a rolling mill, throttle elements are used, which shut off the lateral flow of the lubricating film in a partial region between the roll neck and the bearing surface of the roll neck bearing assembly, thereby bringing about an increase in pressure in the lubricating film. At least one throttle element is embodied as an annular segment, forming an angular shut-off region for the lubricant in the annular gap. The invention makes it possible for existing installations to be easily retrofitted, without the need for structural modifications. In the case of new installations, the same load-carrying capacity as before can be provided while the dimensions of the installation space are reduced. The load- (Continued)

carrying capacity of the bearing assembly can be flexibly adjusted based on the dimensions of the shut-off region for the flow of lubricant.

13 Claims, 7 Drawing Sheets

(51) Int. Cl.
    *F16C 13/00*     (2006.01)
    *F16C 13/02*     (2006.01)
    *F16C 33/10*     (2006.01)
    *F16C 33/74*     (2006.01)

(52) U.S. Cl.
    CPC ............ *F16C 33/74* (2013.01); *F16C 13/022* (2013.01); *F16C 33/103* (2013.01); *F16C 33/105* (2013.01); *F16C 33/1045* (2013.01); *F16C 2320/23* (2013.01); *F16C 2322/12* (2013.01)

(58) Field of Classification Search
    CPC ..... B21B 31/076; B21B 31/078; B21B 27/02; B21B 27/06; B21B 27/10; B21B 45/0239; B21B 45/0245
    See application file for complete search history.

(56) References Cited

U.S. PATENT DOCUMENTS

| | | | |
|---|---|---|---|
| 3,550,971 A | * | 12/1970 | Wochnik ................ B21B 31/07 384/316 |
| 4,944,609 A | | 7/1990 | Salter, Jr. |
| 5,246,294 A | * | 9/1993 | Pan ...................... F16C 17/105 384/110 |
| 6,146,020 A | | 11/2000 | Innis, Jr. |
| 2007/0158916 A1 | | 7/2007 | Roeingh |
| 2011/0278801 A1 | | 11/2011 | Wojtkowski |

* cited by examiner

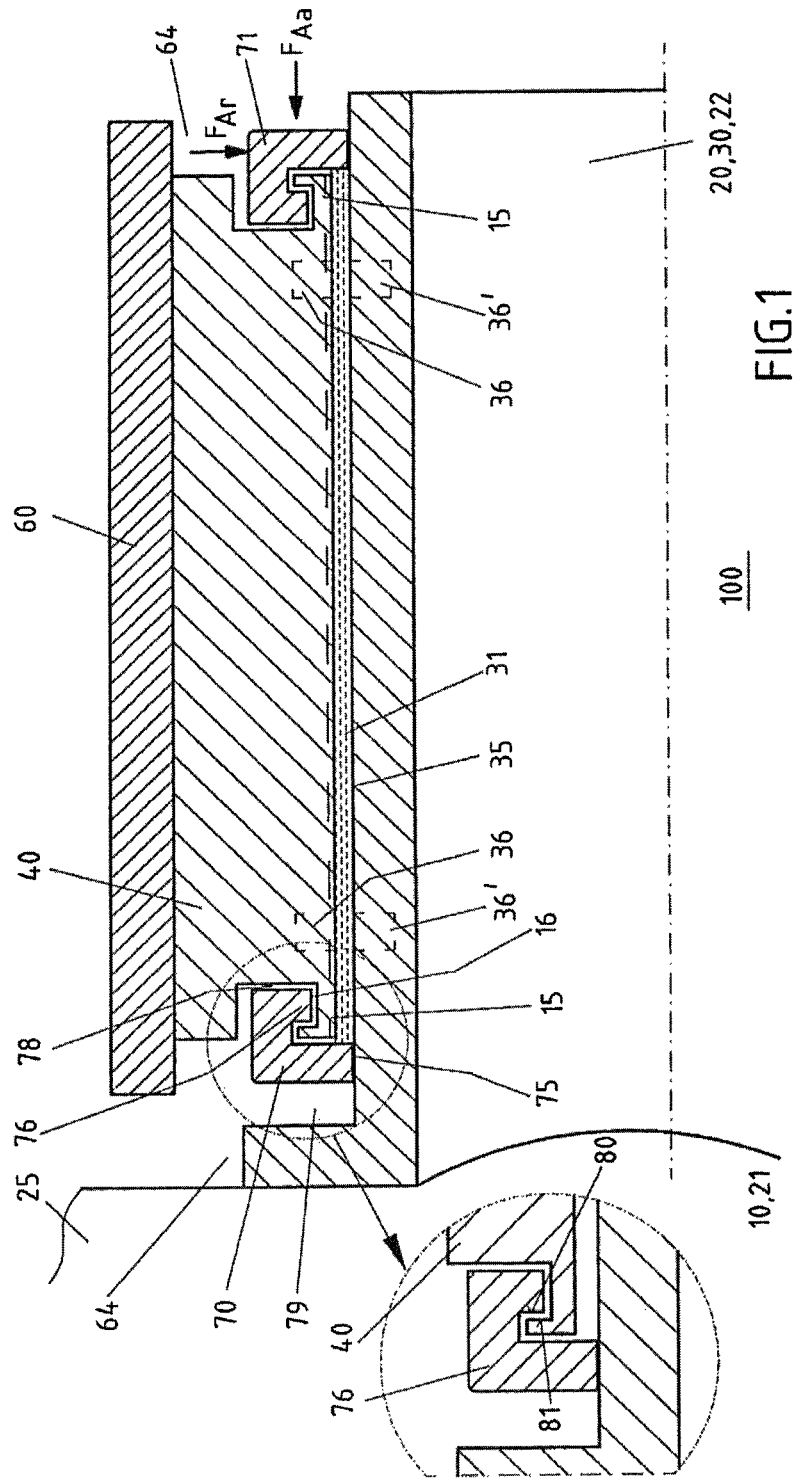

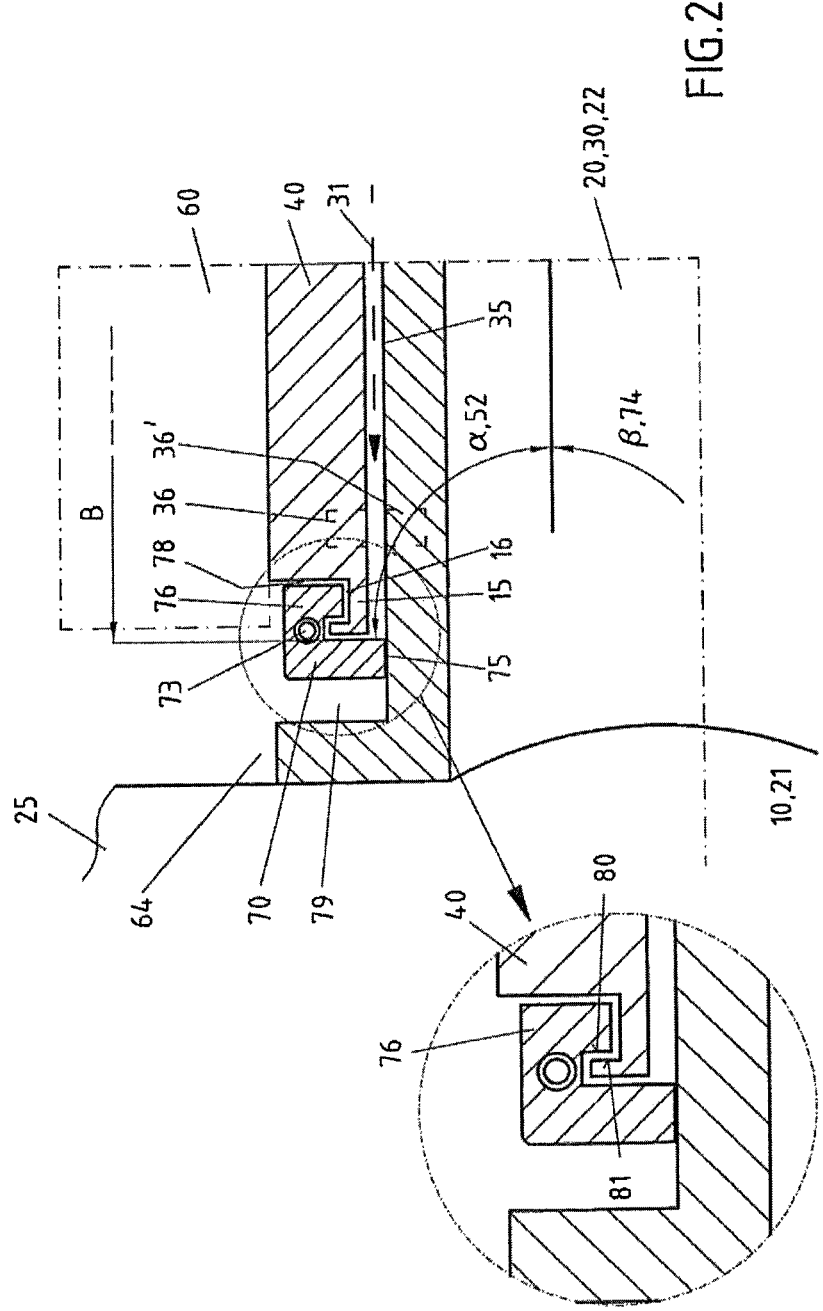

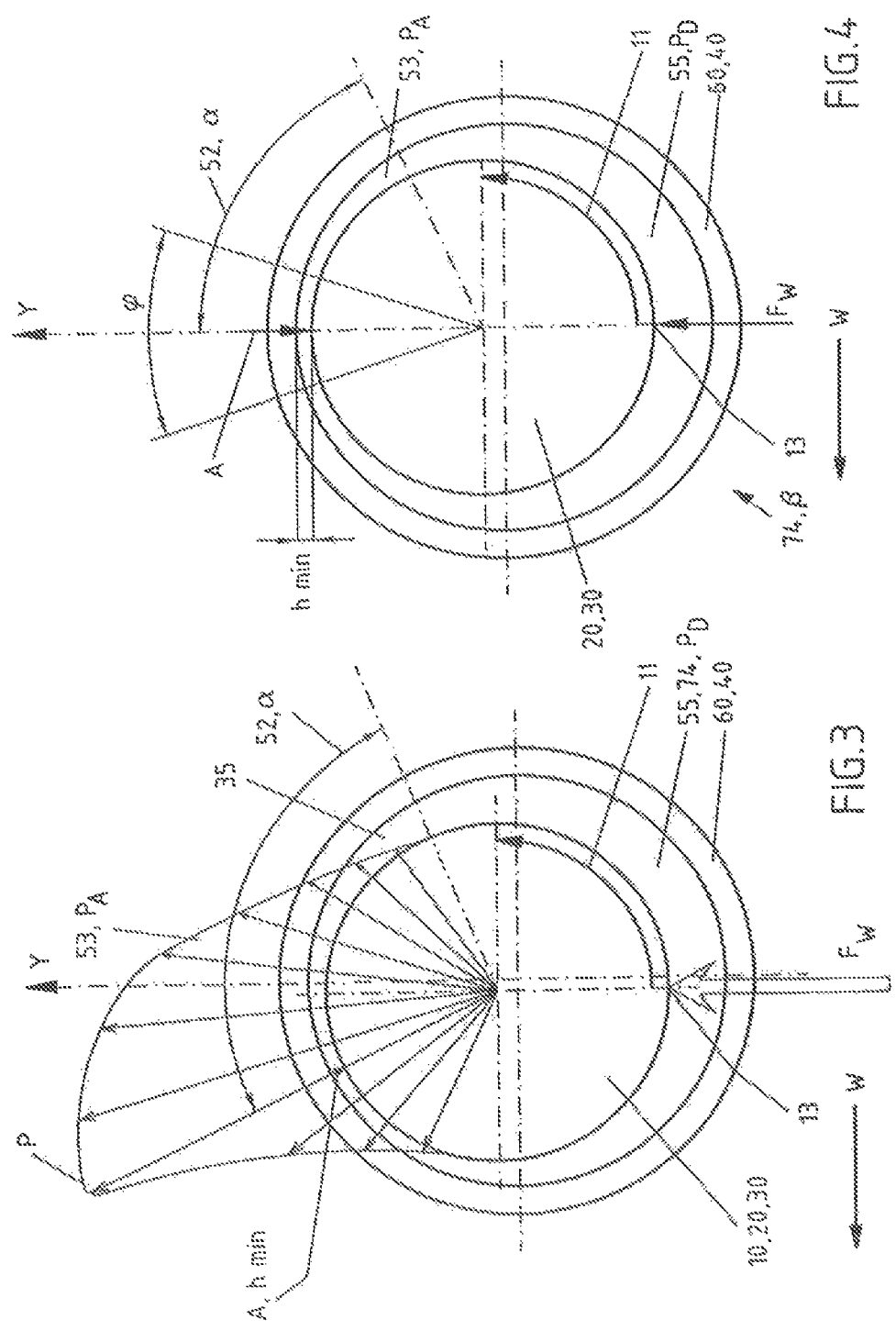

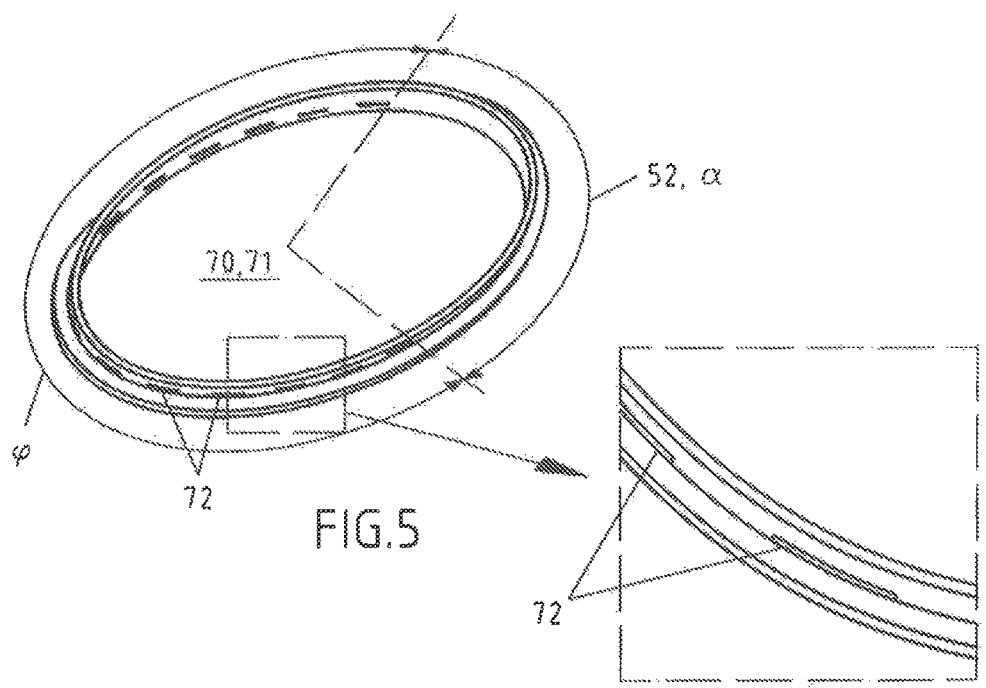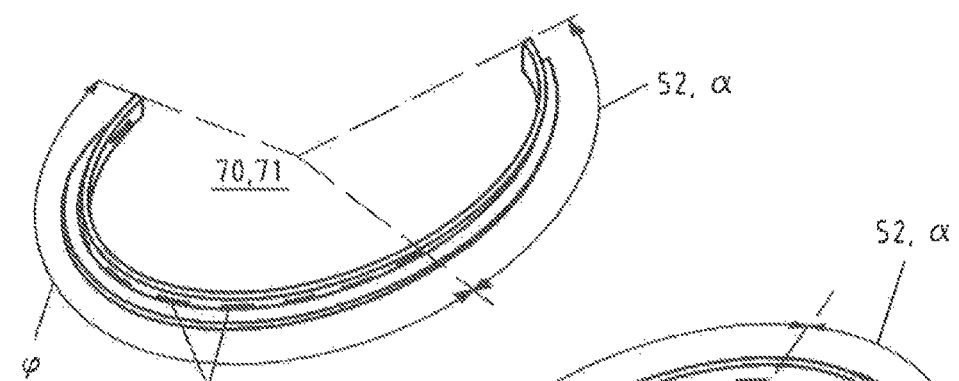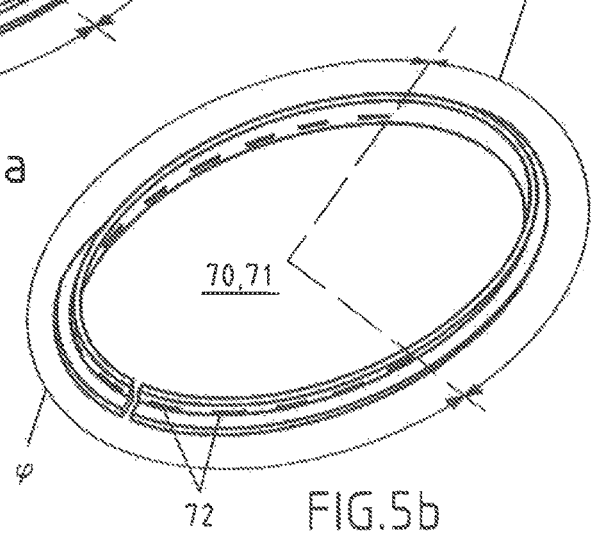

ROLL ASSEMBLY FOR ROLLS IN A ROLLING MILL

RELATED APPLICATIONS

This application is a National Stage Application of International Application PCT/EP2014/074256 filed Nov. 11, 2014 and claiming priority of German Application DE 10 2013 224 117.8 filed Nov. 26, 2013, both applications are incorporated herein by reference thereto.

The invention relates to a roll assembly for rolls in a rolling mill comprising a roll having a roll barrel and at least one roll neck, and a chock having a receiving opening for receiving the roll neck. The inner diameter of the receiving opening for the roll neck is embodied as greater than the outer diameter of the roll neck so as to form an annular gap for receiving a lubricant between the chock and the roll neck. A first throttle element is disposed on the roll barrel-side end face of the receiving opening of the chock, and a second throttle element is disposed on the end face of the receiving opening of the chock that is remote from the roll barrel, with each throttle being provided for sealing the annular gap, wherein the throttle elements are mounted in a rotationally fixed manner.

PRIOR ART

In the case of oil film bearings, which are commonly used in rolling stands for the mounting of backup rolls, one roll neck rotates in a standing bearing bush, wherein the bearing bush is located in a chock. The difference in diameter between the roll neck and the bearing bush is normally in the range of 1% of the bearing diameter, i.e. about 1 mm of clearance for a 1 m bearing diameter.

When external force, for example the rolling force, is applied to the bearing assembly, first the rotating roll neck is displaced eccentrically toward the bearing bush in a radial direction, opposite the external force direction. The annular gap that forms as a result between the roll neck and the bearing bush then has a minimal cross-section on one side and precisely opposite this side has a maximum cross-section. The oil, which is supplied to the bearing gap via hydrodynamic pockets, is transported through the adhesive condition at the rotating surface of the roll neck into the area having the narrowest cross-section. Since the cross-section of the gap becomes steadily smaller up to the narrowest point, the oil is forced out toward the side of the bearing. At the same, however, the pressure in the oil film increases, enabling the bearing to carry greater external force. The oil that is forced out on both sides of the bearing is usually referred to as the side flow of the bearing.

The documents EP 1 031 389 B1, EP 1 699 575 B1 and DE 198 31 301 A1 describe sealing devices for rolls in rolling mills.

The document DE 31 17 746 A1 describes a hydrodynamic radial bearing.

The technical document "OIL-FILM BEARINGS FOR ROLLING-MILLS", copyright 1967, American Society of Lubrication Engineers (prepared by the Steel Industry Council of the American Society of Lubrication Engineers) describes hydrostatic oil film bearings for rolls in a rolling mill.

The oil film between the roll neck and the bearing surface that receives the roll neck is hereinafter also referred to as a lubricating film. One disadvantage of systems without side flow reduction is the high level of side flow of the lubricant, even when this is not necessary for cooling. This necessitates high expenditure on supply and a large periphery in order to provide sufficient lubricant. At low rotational speeds, additional hydrostatic support is necessary in order to accommodate greater rolling forces; otherwise, the load-carrying capacity of the bearing will be relatively low. In addition, the specific overall size may be large, depending on the rolling force that is required.

One disadvantage in systems that have a completely closed, sealed off side flow of the lubricant film is, for example, that between the roll neck and the corresponding bearing surface of the bearing assembly for the roll neck, the operating temperature increases, particularly at higher rotational speeds, making costly cooling systems necessary in order to limit or moderate the rise in temperature. The increase in temperature decreases the viscosity of the lubricant. As a consequence, the lubricant pressure also decreases, reducing the load-carrying capacity of the bearing assembly. In most cases, flow check valves are integrated into closed systems, to prevent the cooling circuit from running empty. The sealing elements are drawn onto the roll in a complex manner with spring bias. High dimensional accuracy, i.e. small tolerances, particularly with respect to the concentricity of the seal, are required. This complicates assembly, and therefore the sealing elements are divided based on bearing type and bearing size. A further disadvantage is that the chock or the bearing bush must be embodied as divided based on their assembly.

OBJECT OF THE INVENTION

It is the object of the invention to increase the load-carrying capacity or the rolling capacity of a roll assembly for rolls in a rolling mill while maintaining or decreasing the overall size thereof. As a further object, the invention should be easy to assemble and able to be installed in existing installations.

Characteristic of the roll assembly according to the invention is that the first and second throttle elements each form an angular region for shutting off the lubricant in the annular gap and are positioned in such a way that the angular region for shutting off the lubricant extends starting from a bearing load point A—the angular position of the narrowest gap $h_{min}$ in the case of the load between roll neck and chock—counter to the direction of rotation of the roll, over an angle $\alpha$ of at least 25° to at most 270°.

Shutting off the side flow of lubricant in the roll assembly according to the invention causes the pressure of the lubricant to increase in the region of the bearing load point, resulting in an increase in load-carrying capacity or rolling capacity of the roll assembly. At the same time, the thickness of the lubricant film in the region of the bearing load point is increased, and thus the operational reliability, for example with respect to off-center travel and with respect to start-up behavior is improved. Particularly in the front rolling stands of a roll assembly, in which only a small amount of heat is generated in the bearing due to the relatively low speed, and therefore little cooling is required, the build-up of pressure can be advantageously impacted.

The invention makes it possible to easily retrofit existing installations. Without enlarging the structural space, the rolling capacity and thus the performance capacity of existing rolling mills can be increased by up to 40% during the course of measures to modernize the existing mills. Existing mills can be retrofitted easily and cost-efficiently to meet increased rolling capacity demands, for example by processing other material grades or material thicknesses. In so doing, it is not necessary to alter the length of the existing bearing bush or the chock, since the throttle element can be mounted or inserted into a gap between the bearing bush or the chock and the roll barrel, which is present in any case.

If increased rolling capacity is not required, then roll assemblies in new installations can be designed with smaller overall dimensions in new installations, to ensure the same load-carrying capacity as before. This results above all in a savings of installation space, material costs and production time.

Dependent on the dimensions of the shut-off region for the flow of lubricant, the load-carrying capacity of the bearing assembly can be determined precisely in advance using corresponding computing models, and based on long-term experience and tests, and can be modified and adjusted in a flexible manner by means of at least one throttle element, without making structural modifications to the chock and/or the roll. As the size of the angle for the shut-off region increases, the flow of lubricant out of the annular gap is suspended. The reduction or throttling of the side flow of the lubricant within the bearing assembly advantageously leads to an increase in the load-carrying capacity of the roll assembly.

This increase in load-carrying capacity is advantageously achieved without fear of overheating the bearing assembly. This is because in an angular flow-through region measuring 360°, which is complementary to the angular shut-off region, minus the angular shut-off region, the throttle elements according to the invention allow a sufficient lateral discharge of the lubricant to ensure a sufficient removal of heat from the bearing.

According to a first embodiment example, it is provided that bearing load point A in the case of a load is located within an angular region of $\varphi=+/-25°$ in relation to center axis Y of the roll, which is perpendicular to the plane of the rolling stock.

It is further preferably provided that the throttle elements are arranged with a contact surface abutting against the roll neck, forming a positive connection in the radial direction and a seal. As a result, the flow of lubricant from the annular gap is advantageously suspended, and an increase in pressure of the lubricant in the angular shut-off region is achieved.

The invention preferably further provides that the first or the second throttle element or both throttle elements is/are configured as an annular segment. This allows the same or different flow-through regions or shut-off regions for the lubricant to be advantageously formed in the annular gap and, depending on the load case, allows a predefined value to be set for the theoretically determined load-carrying capacity of the bearing. The assembly of the annular segment-shaped throttle elements according to the invention is simplified as a whole over the prior art, thereby saving on assembly time and costs.

According to a further embodiment example, it is provided that a compression spring is disposed on the outer periphery of the annular segment, for pressing the annular segment in a radial direction against the roll neck, forming a seal.

It is further preferably provided that the first or the second or both throttle elements is/are embodied as a throttle ring with the angular shut-off region and an angular flow-through region for the lubricant in the annular gap, wherein the angular flow-through region is formed by flow openings in the throttle ring, and wherein the angular flow-through region extends bordering on the angular shut-off region over an angular range of 360° minus the angular shut-off region.

According to another embodiment example, it is preferably provided that the throttle ring is embodied as a snap ring having a gap, the gap being formed in the angular flow-through region.

The invention further preferably provides that a bearing bush for receiving the roll neck is arranged in a rotationally fixed manner in the chock. When it becomes worn, the bearing bush can be easily replaced with a new bearing bush.

It is preferably further provided that the throttle elements are mounted on the chock or on the bearing bush. Once the roll has been disassembled, the throttle elements are advantageously freely accessible and can be replaced easily without a large outlay in terms of assembly. In existing installations, the throttle elements can also be mounted on the chock or the bearing bush, for example by means of a screw connection or plug-in connection, and retrofitted.

According to a further preferred embodiment example, it is provided that an annular groove is formed on at least one of the end faces of the bearing bush or the chock, and that at least one of the throttle elements has a flange on its rear side facing the chock, for engaging into the annular groove. A simple mounting by means of a screw connection, a clamping connection or a plug-in connection can thereby be advantageously provided, which further ensures an optimal mounting and fastening of the throttle element. The replacement of the throttle element is thus simplified. The time required and the cost of assembly for the throttle elements according to the invention are reduced as compared with the seals that are known from the prior art.

The invention preferably provides that an oil collecting space is formed between the chock and the roll barrel, and at the end of the roll neck that is remote from the roll barrel. Advantageously, the lubricant can be diverted through the flow-through region of the throttle element into the existing oil collecting space, thereby preventing a backup of lubricant. The lubricant is taken from the oil collecting space for cooling in cooling devices provided for this purpose.

The invention further preferably provides that a neck bush is disposed on the roll neck, and that the neck bush is rotatably mounted with the roll neck in the bearing bush. When it becomes worn, the neck bush can be replaced with a new or refurbished neck bush.

The invention further preferably provides that the throttle element is embodied as a multipart element. The outlay for assembly is thereby advantageously reduced due to the smaller dimensions of the individual segments, and the cost of producing the individual segments is decreased due to the larger lot sizes.

The invention further preferably provides that the annular gap is embodied as having at least one peripheral annular channel in the region between the first and second throttle rings. Transitioning the annular gap into the peripheral annular channel gives the lubricant increased volume. The increased volume advantageously provides an additional pressure compensation zone as a buffer for the lubricant in the annular gap. This enables an even finer adjustment of the pressure conditions, i.e. a decrease in pressure, to be achieved within the roll bearing assembly, particularly in the case of higher rotational speeds. The maximum surface speed of the neck bush or of the roll neck during rolling operation beyond which the at least one additional annular channel should preferably be installed for the purpose of reducing pressure is 4 m/s. The annular channel can be adapted to the size and shape of the respective bearing load point of the bearing.

It is preferably further provided that the rolls are embodied as working rolls, support rolls and/or intermediate rolls.

Further advantages and details of the invention are found in the dependent claims and in the following description, in which the embodiments of the invention shown in the figures are specified in greater detail. In addition to the combinations of features described above, features taken alone or in other combinations are also considered essential to the invention.

DESCRIPTION OF THE FIGURES

FIG. 1: the roll assembly according to the invention with throttle elements on both sides;

FIG. 2: an enlarged partial view of the roll assembly according to the invention;

FIG. 3: a schematic representation of the pressure ratios of a roll bearing assembly under a load;

FIG. 4: a schematic representation of the angular flow-through region and of the angular shut-off region of the roll assembly according to the invention;

FIG. 5: an example of an embodiment of a throttle ring;

Figure 6C:
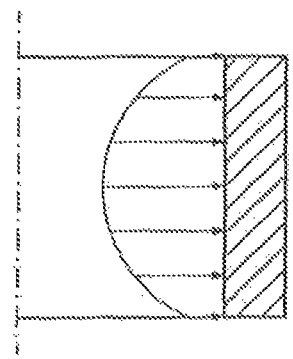
FIG. 6c: the load-carrying capacity of the bearing according to the prior art with the side flow of the lubricant completely sealed off.

The representation in FIG. 1 depicts a roll assembly 100 for rolls 10 in a rolling mill, according to the invention. Roll 10 is embodied as having a roll barrel 25 and at least one roll neck 20. A chock 60 having a receiving opening is provided for receiving the roll neck 20, wherein the inner diameter of the receiving opening is embodied as greater than the outer diameter of the roll neck 20, such that an annular gap 35 forms between chock 60 and roll neck 20. A lubricant 31, e.g. hydraulic fluid, is located within annular gap 35. In the region of the roll barrel-side end 21 of chock 60, a first throttle element 70 is provided, and in the region of the end 22 of chock 60 that is remote from the roll barrel, a second throttle element 71 is provided, each being designed for sealing annular gap 35, wherein throttle elements 70, 71 are secured against rotation relative to roll neck 20. The securing is accomplished, for example, by means of routine fastening elements such as screws, rivets, bolts, pins, etc. Also possible, however, is a stop on bearing bush 40 or chock 60, against which the throttle element rests, or a milled-out section on bearing bush 40 or chock 60, into which the throttle element is inserted in a precise fit, to prevent the throttle element from rotating in the circumferential direction. The first and second throttle elements 70, 71 each form an angular shut-off region 52, a for lubricant 31 in annular gap 35.

Throttle element 70, 71 is preferably made of a commercially available elastomer or an elastomer/steel combination.

According to a first exemplary embodiment, the first or the second throttle element, or both throttle elements 70, 71 is/are preferably embodied as an annular segment. As annular segments, they extend over only a circular arc length that corresponds to the circular arc length of the angular shut-off region. The annular segments are disposed on the bearing bush or on the chock such that they extend over the angular shut-off region and seal said region. To ensure a positively locking and sealing contact of the annular segments on the surface of the roll neck, a compression spring can be provided on the outer periphery of the annular segments, which presses the annular segment in the radial direction against the roll neck.

According to a second embodiment, the first or the second throttle element, or both throttle elements 70, 71 is/are embodied as a throttle ring having an angular shut-off region 52, a and an angular flow-through region 74, β for lubricant 31 in the annular gap. Angular flow-through region 74, β is formed, for example, by openings 72 in the throttle ring. The angular flow-through region extends bordering on the angular shut-off region over an angular range of 360° minus the angular shut-off region, as is shown in detail in FIG. 5.

Throttle ring 70, 71 is preferably embodied in the form of a snap ring having a spring element incorporated or extruded therein, so that throttle ring 70, 71 is engaged or pressed by the spring-biasing force in the form of radial pressing force FAr against roll neck 20, in a positive connection with contact surface 75, forming a seal.

FIG. 1 shows one possible way in which throttle elements 70, 71 can be coupled to bearing bush 40 or to the chock, regardless of whether the throttle elements are embodied as an annular segment or as a throttle ring. For this purpose, an annular groove having a radially extending stop 15 is provided on the bearing bush or on the chock, for connecting or for receiving throttle element 70, 71. Depending on the use, bearing bush 40 may be embodied as integral with chock 60. To implement the coupling, the throttle elements, regardless of whether they are embodied as a throttle ring or as an annular segment, each have a flange on their rear side that faces the chock, which engages or snaps into the annular groove. In the case of the annular segment, the compression spring on the outer periphery guarantees the securing of the respective flange and therefore of the throttle element in the annular groove, and in the case of the throttle ring, the embodiment thereof as a snap ring with the spring biasing force $F_{Ar}$ guarantees the same.

In the axial direction, the throttle elements can be pressed with an axial pressing force $F_{Aa}$ onto the chock or the bearing bush by means of known fastening elements, such as rivets, screws, clamps, etc.

To compensate for changes in length caused by temperature variations and bearing movements during operation, the width of annular groove 16 in the axial direction of roll neck 20 is greater than the width of a flange 76 of the throttle element 70, 71, which is mounted in annular groove 16, forming a first gap 78 between an end face of chock 60 or bearing bush 40 and flange 76. In addition, between chock 60 or bearing bush 40 and the end face of roll barrel 25, a second gap 79 is disposed, in which at least a portion of the profile cross-section of throttle element 70, 71 is mounted with clearance. Flange 76 is mounted in annular groove 16 such that a first sealing surface 80 on flange 76 is pressed against an opposite second sealing surface 81 on stop 15 with an axial pressing force $F_{Aa}$, thereby sealing the flow of lubricant out of annular gap 35. The necessary axial pressing force $F_{Aa}$ is applied, for example, by means of a spring, a clamping ring or a screw connection. It can likewise be provided that throttle element 70, 71 is coupled to the chock or the bearing bush by means of a mechanical coupling, for example in the form of screws, rivets or bolts, forming a seal (not shown in the figures).

Between chock 60 and roll barrel 25, an oil collecting space 64 for collecting lubricant 31 is provided, wherein lubricant 31 is forced out of annular gap 35 by the rotational movement of roll 10, and is discharged through the flow-through angular region into said collecting space 64. A collecting space 64 for lubricant 31 is preferably also provided at the end 22 of roll neck 20 that is distant from the roll barrel.

Not shown in FIG. 1 is the embodiment of throttle element 70, 71 in a multipart design. In that case, the individual parts are embodied in the form of annular segments, with the segments advantageously having the same shape.

Opposite the first and/or the second throttle element 70, 71 in the direction of the center or half the width of the chock, annular gap 35 is preferably embodied as having at least one peripheral annular channel 36, 36', offset toward the inside. As shown in FIG. 1, this annular channel 36, 36' can be disposed in bearing bush 40. In design terms, however, the additional annular channel 36, 36' may also be disposed on roll neck 20 and/or on bearing bush 40 or chock 60. Annular channel 36, 36' can be embodied with different cross-sectional shapes, e.g. square, advantageously rectangular, semi-oval or triangular, in order to provide collecting spaces of different sizes.

The partial view of FIG. 1 shown in FIG. 2 substantially shows the components of roll assembly 100 on the roll barrel-side end 21 of roll neck 20. The statements relating to the reference signs shown in FIG. 2 correspond to those made previously in the description in reference to FIG. 1. Dimension B describes the total width of chock 60 with bearing bush 40 installed.

FIG. 2 shows a schematic view of angular shut-off region 52, a and angular flow-through region 74, β for lubricant 31 in annular gap 35. In addition, FIG. 4 shows a front view, in which the distribution of angular shut-off region 52, a and angular flow-through region 74, β is represented, in relation to the periphery of roll neck 20.

The flow of lubricant 31 is shut off by throttle element 70 in the shut-off region at the roll barrel-side end 21 of the roll neck 20 or the chock. In the second gap 79, between throttle element 70, 71 and roll barrel 25 or a stop of the roll barrel-side end of neck bush 30, clearance is provided to compensate for axial changes or displacements in the roll assembly during operation. Second gap 79 is also provided in principle in existing systems according to the prior art. Throttle ring 70, 71 according to the invention is advantageously designed such that it can be inserted into the existing clearance in second gap 79, without the total width B of chock 60 having to be reduced for this purpose.

FIG. 3 shows a schematic representation of roll assembly 100 according to the invention as an oil film bearing for support rolls in the operating state, for example. The working roll disposed between rolling stock and support roll 10 is not shown. The direction of rotation of support roll 10 is determined by rolling direction W of rolling stock, taking into consideration the reversal in the direction of rotation by means of the working roll, not shown.

As rolling stock passes through in the indicated rolling direction W, upper support roll 10 rotates counterclockwise, for example, and presses with a rolling force FW against a load application point 13 on the working roll, not shown. The lower support roll, not shown, rotates clockwise and presses accordingly from below with the rolling force—FW via the working roll, not shown, against load application point 13 on rolling stock. As shown in FIG. 3, the rolling force $F_w$ is introduced via roll neck 20 into the roll neck bearing assembly within chock 60. If roll 10 is mounted at the two ends via a roll neck 10, the force acting on the roll neck within the respective roll neck bearing assembly or within the respective chock is ½ $F_w$.

Annular gap 35 is formed between roll neck 20 or neck bush 30 disposed on roll neck 20 and chock 60 or bearing bush 40 disposed in the chock. Angular shut-off region 52, α extends in the opposite direction to the direction of rotation 11 of roll 10, starting from bearing load point A—the angular position of the narrowest gap $h_{min}$ between roll neck 20 and chock 60 in the case of a load. As a result of rolling force $F_w$, roll 10 and thus also roll neck 20 experiences a radial eccentric or asymmetric shift in annular gap 35. In the case of a load, bearing load point A is in an angular range of φ=+/−25° (see FIG. 4), in relation to center axis Y of roll 10, which extends perpendicular to the plane of the rolling stock.

Angular shut-off region 52, α extends, starting from bearing load point A—the angular position of the narrowest gap $h_{min}$ between roll neck 20 and chock 60 in the case of a load—counter to rotational direction 31 of roll 10 over an angle α of at least 25° to at most 270°. Shutting off flow of lubricant 37 by means of throttle element 70, 71 produces a pressure build-up area 53 having a pressure $P_A$. The angular flow-through region that is not shut off by throttling element 70, 71 forms a low-pressure region 55 having a pressure $P_D$. By selecting throttle elements 70, 71 of different sizes, i.e. by predefining segment angle α of each throttle element 70, 71, angular shut-off region 52, α and angular flow-through region 74, β are modified, with the result that the effective degree of the increase in load-carrying capacity can be adjusted in a flexible manner.

The roll assembly according to the invention can be used principally for the mounting of support rolls and/or intermediate rolls.

The schematic representation in FIG. 4 fundamentally corresponds to the representation of FIG. 3. In addition, FIG. 4 shows angular region φ=+/−25° for bearing load point A—in relation to center axis Y of roll 10, which extends perpendicular to the plane of the rolling stock. In the case of a load, the narrowest gap $h_{min}$ forms at bearing load point A between roll neck 20 and chock 60. The actual position of bearing load point A is dependent, i.a., on the thickness, the strength and the rolling speed of rolling stock W. Bearing load point A adjusts automatically in the case of a load.

FIG. 5 describes a possible embodiment of throttle element 70, 71 as a throttle ring with flow openings 72. In this embodiment, angular flow-through region 74, β is formed by flow-through openings 72 in the throttle ring. Angular shut-off region 52, α is formed without flow-through openings. The throttle ring is attached to the chock or the bearing bush in such a rotational angle position that the shut-off region, starting from the pre-calculated position of the bearing load point, extends counter to the direction of rotation of the roll. In the possible embodiment as a snap ring, in order to simplify assembly it is provided that the throttle ring is separated at a separation point T and that a slight gap forms there, within the flow-through region.

Figure 6B:
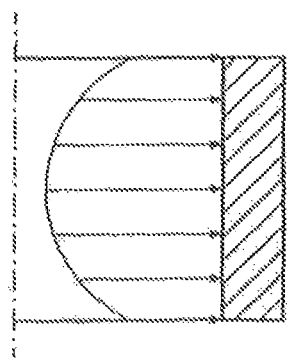
FIG. 6b: the load-carrying capacity of the bearing according to the roll assembly of the invention with the side flow of the lubricant partially sealed.
Figure 6A:
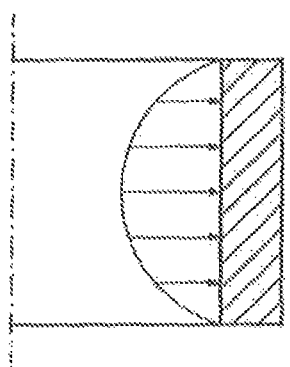
FIG. 6a: the load-carrying capacity of the bearing according to the prior art with the side flow of the lubricant unsealed.

FIGS. 6a to 6c show a schematic comparison view of the pressure ratios of various oil film bearings. FIG. 6a shows an oil film bearing according to the prior art, in which the side flow of lubricant is not sealed off. The center diagram of FIG. 6b depicts the partial lateral sealing of the oil film bearing by means of throttle elements 70, 71 according to the invention. The diagram of FIG. 6c depicts an oil film bearing according to the prior art, in which the side flow is completely sealed off. It is clear from the figures that the partial sealing according to the invention results in the greatest load-carrying capacity of the oil film bearing.

Figure 7B:
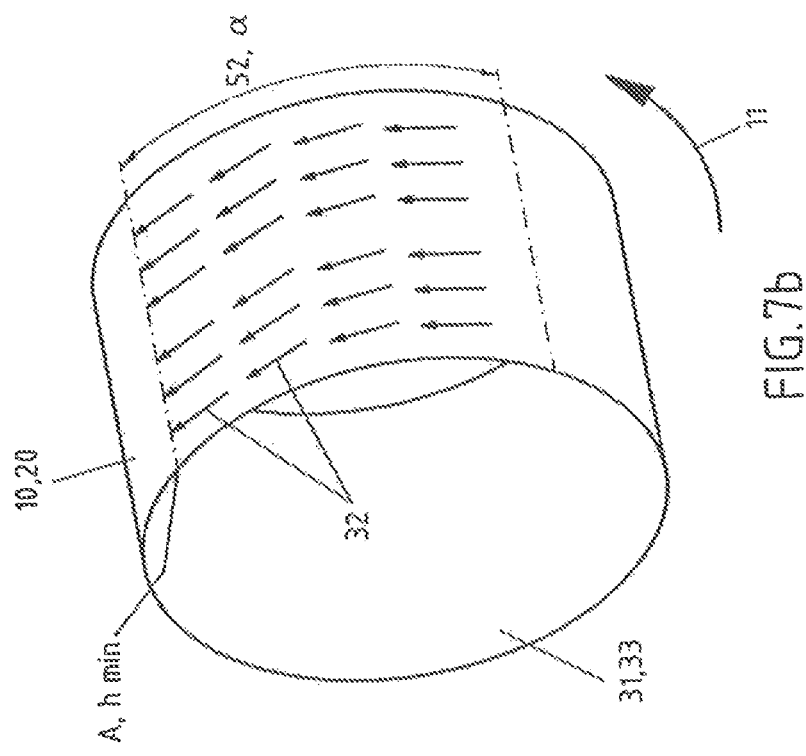
FIG. 7b: the flow of lubricant on the inner side of the bearing bush or chock with partial side flow restriction according to the roll assembly of the invention.
Figure 7A:
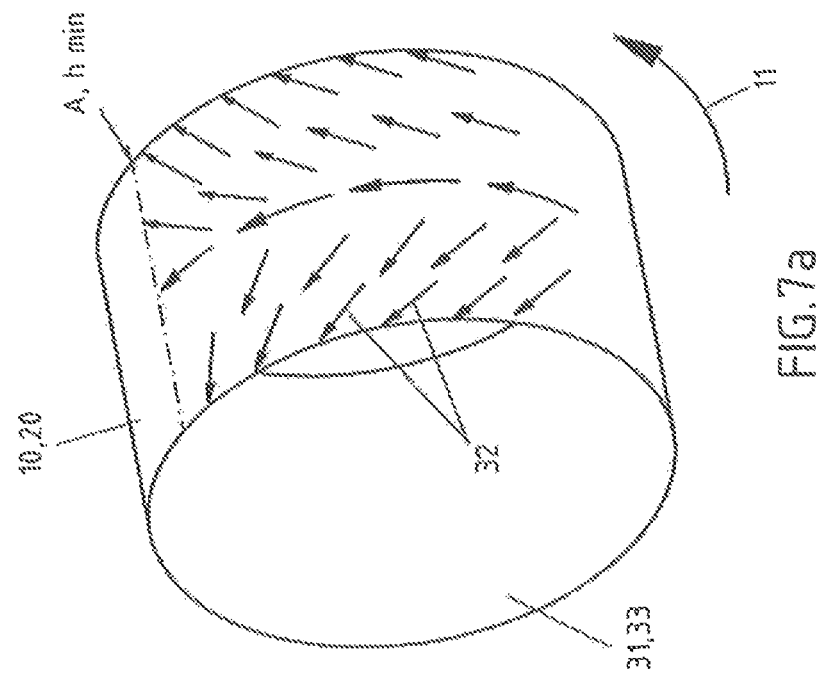
FIG. 7a: the flow of lubricant on the inner side of the bearing bush or chock without side flow restriction according to the prior art.

FIGS. 7a and 7b show schematic views of flow lines 32 for the oil film or lubricant as a comparison between a bearing without side flow restriction, as shown in FIG. 7a, and the oil film bearing according to the invention with side flow restriction, as shown in FIG. 7b. The rotational direction 11 of roll 10 or roll neck 20 is counterclockwise. Lubricant 31 is introduced into annular gap 35 (not shown) via an oil feed 33. As the roll neck rotates, lubricant is distributed in the directions indicated by the arrows within the oil film bearing. In this arrangement, the flow of lubricant in the roll assembly according to the invention as shown in FIG. 7b is shut off in angular shut-off region 52, α such that a side flow of lubricant 31 is prevented in some areas. The narrowest gap $h_{min}$ forms at bearing load point A, and therefore the lubricant film thickness is minimal at that point.

Figure 8B:
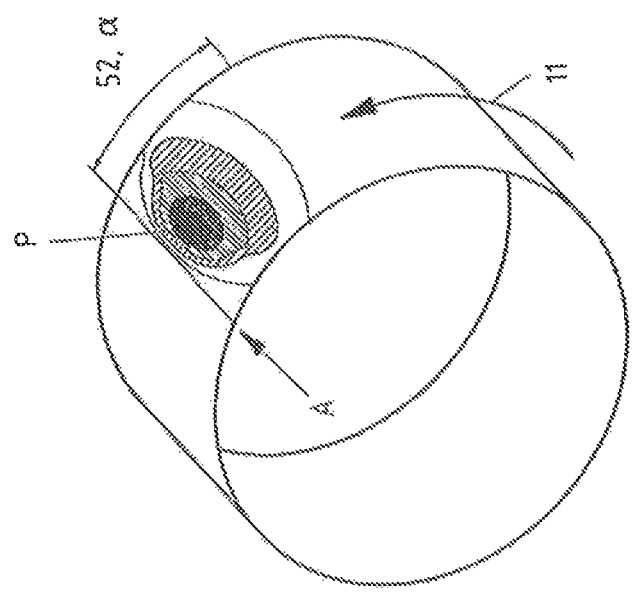
FIG. 8b: the pressure distribution on the inner side of the bearing bush or chock with partial side flow restriction according to the roll assembly of the invention.
Figure 8A:
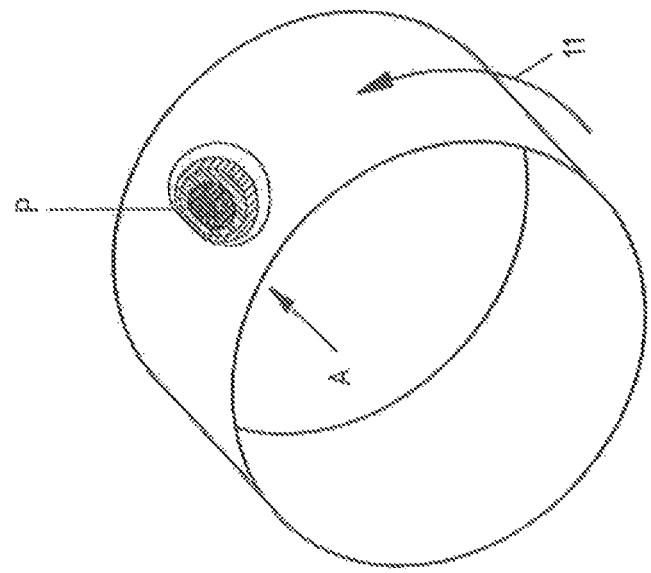
FIG. 8a: the pressure distribution on the inner side of the bearing bush or chock without side flow restriction according to the prior art.

FIGS. 8a and 8b show schematic views of the pressure distribution on the inner side of bearing bush in a comparison of an oil film bearing without side flow restriction according to FIG. 8a, as is known from the prior art, and the oil film bearing according to the invention with partial side flow restriction, according to FIG. 8b. The descriptions relating to the reference signs correspond to the previous descriptions.

Functional Description

When an external force, for example a rolling force $F_w$, is applied to the bearing of roll neck 20 via chock 60, roll 10 is first displaced radially in relation to chock 60, or in relation to a bearing bush 40 in chock 60, wherein bearing bush 40 can also be embodied as integral with chock 60. The following description is based on the exemplary embodiment of the bearing assembly in which a bearing bush 40 is disposed in chock 60, and a neck bush 30 is disposed on roll neck 20. The clearance between bearing bush 40 and neck bush 30 causes an annular gap 35 for receiving a lubricant 31 to form. In the case of a load, annular gap 35 forms a minimal gap $h_{min}$ between bearing bush 40 and neck bush 30 at a bearing load point A. Lubricant 31, which is fed to annular gap 35 via a lubricant feed 33, for example via hydrodynamic pockets, is transported by virtue of the adhesive conditions on the rotating surface of neck bush 30, which is form-fittingly connected to roll neck 20, into the narrowest gap $h_{min}$ in the region of bearing load point A. Since the cross-section of the gap becomes steadily narrower up to the narrowest point $h_{min}$, lubricant 31 seeks to escape toward the side of the bearing. At the same time, however, the pressure $P_A$ in lubricating film 31 also increases, enabling roll assembly 100 to carry an external force, e.g. rolling force $F_w$.

According to the invention, the side flow of lubricant 31 is reduced by the use of throttle elements 70, 71, which are disposed on the two sides of bearing bush 40. This reduction in side flow within an angular shut-off region 52, α=25° to a maximum of 270°—starting from bearing load point A and running counter to rotational direction 11 of roll 10—results in a distinct increase in pressure and thus an increased load-carrying capacity of up to 40%, without an increase in the temperature of lubricant 31, which would adversely affect fluid viscosity and thus the load-carrying capacity of the bearing.

Particularly in the front roll stands of a rolling mill, in which, due to the relatively low speed, only a small amount of heat is generated in the bearing assembly and therefore only little cooling is required, the pressure build-up can be particularly positively affected by the assembly according to the invention.

By varying the size of the shut-off region by means of throttle element 70, 71 on the roll barrel-side end of roll neck 21 and/or on the end of roll neck 22 that is distant from the roll barrel, the maximum load-carrying capacity of the oil film bearing can be preset based on theoretical calculations in advance of a rolling operation, with a maximum allowance for error of +/−5%. The following may be used as basic formulas for calculating the fluid flow rate as a function of the intrinsic pressure development in an oil film bearing without side flow restriction (source: DIN 31652, part 1):

$$Q_1 = D^3 \cdot \Psi_{eff} \cdot \omega_{eff} \cdot q_1$$

$Q_1$=side flow of the fluid
D=bearing inner diameter
$\Psi_{eff}$=effective bearing clearance
$\omega_{eff}$=hydrodynamically effective angular velocity $$q1 = f\left(\varepsilon, \frac{B}{D}, \Omega\right)$$

ε=relative eccentricity
B=width of the bearing
Ω=angle of enclosure

When throttling is introduced, the unimpeded side flow of lubricant 31 is reduced from $Q_1$ to $Q_1^*$, causing the pressure of lubricant 31 to increase. This results in the flow ratio:

$$\pi = \frac{Q_1^*}{Q_1}$$

$Q_1$=unthrottled bearing side flow of the fluid
$Q_1^*$=throttled bearing side flow of the fluid
π=flow ratio
with π=1→unthrottled bearing side flow of the fluid
with π=0→fully throttled bearing side flow of the fluid
The invention operates in the range of 0<π<1.

LIST OF REFERENCE SIGNS 100 roll assembly
10 roll
11 direction of rotation
13 load application point
15 stop
16 annular groove
20 roll neck
21 roll barrel-side end of the roll neck
22 end of roll neck distant from roll barrel
25 roll barrel
30 neck bush
31 lubricant
32 flow lines
33 lubricant supply
35 annular gap
36 annular channel 36' annular channel
40 bearing bush
52 angular shut-off region
53 pressure build-up region
55 low-pressure region
60 chock
64 oil collecting space
70 first throttle element
71 second throttle element
72 flow-through openings
73 clamping element
74 flow-through region
75 bearing surface
76 flange
78 first gap
79 second gap
80 first sealing surface
81 second sealing surface
α angle of the shut-off region
β angle of the flow-through region
φ angle range for the bearing load point
A bearing load point
B total width of chock, if appropriate with bearing bush
$F_{Ar}$ radial pressing force
$F_{Aa}$ axial pressing force
$F_w$ rolling force
P pressure/pressure distribution
$P_A$ pressure in the angular shut-off region
$P_D$ pressure in the angular flow-through region
T separation point
$W_{12}$ rolling direction
Y center axis of the roll
$h_{min}$ narrowest gap

The invention claimed is:

1. A roll assembly (100) for rolls in a rolling mill, comprising:
 a roll (10) having a roll barrel (25) and at least one roll neck (20);
 a chock (60) having a receiving opening for receiving the roll neck (20), wherein an inner diameter of the receiving opening is greater than an outer diameter of the roll neck (20) such that an annular gap (35) for receiving a lubricant (31) is formed between the chock (60) and the roll neck (20);
 a first throttle element (70), which is disposed in a rotationally fixed manner at a roll barrel-side end face of the receiving opening of the chock for sealing the annular gap (35); and
 a second throttle element (71), which is disposed in a rotationally fixed manner at an end face of the receiving opening of the chock that is distant from the roll barrel, for sealing the annular gap (35);
 characterized in that
 the first and second throttle elements (70, 71) each form an angular shut-off region (52, α) for the lubricant (31) in the annular gap (35) and each is positioned in such a way that the angular shut-off region (52, α) extends starting from a bearing load point (A), the bearing load point being an angular position of a narrowest gap (hmin) between the roll neck (20) and the chock (60) in the case of a load between the chock and the roll neck, in a direction opposite a rotational direction of the roll (10), over an angle (α) of at least 25° to at most 270°.

2. The roll assembly (100) according to claim 1, characterized in that,
 in the case of the load between the chock and the roll neck, the bearing load point (A) is located in an angular region of φ=+/−25° in relation to a center axis (Y) of the roll (10), which extends perpendicular to a plane of the rolling stock.

3. The roll assembly (100) according to claim 1, characterized in that
 the throttle elements are arranged abutting against the roll neck (20) in a radial direction of the roll, forming a seal therebetween.

4. The roll assembly (100) according to claim 1, characterized in that
 the first or the second throttle element or both throttle elements (70, 71) is/are configured as an annular segment.

5. The roll assembly according to claim 4, characterized in that
 a compression spring is disposed on an outer periphery of the annular segment, for the purpose of pressing the annular segment in a radial direction of the roll against the roll neck, forming a seal.

6. The roll assembly (100) according to claim 1, characterized in that
 the first or the second or both throttle elements is/are formed as a throttle ring having the angular shut-off region (α, 52) and an angular flow-through region (β, 74) for the lubricant (31) in the annular gap (35), wherein the angular flow-through region (β, 74) is formed by flow-through openings in the throttle ring, and wherein the angular flow-through region extends bordering the angular shut-off region over an angular range of 360° minus the angular shut-off region.

7. The roll assembly according to claim 6, characterized in that
 the throttle ring is formed as a snap ring having a gap, wherein the gap is formed in the angular flow-through region.

8. The roll assembly (100) according to claim 1, characterized in that
 a bearing bush (40) for receiving the roll neck (20) is disposed in a rotationally fixed manner in the chock (60).

9. The roll assembly (100) according to claim 1, characterized in that
 the throttle elements (70, 71) is/are coupled to the chock (60) or to a bearing bush (40).

10. The roll assembly (100) according to claim 9, characterized in that
 an annular groove (16) is formed on at least one of the end faces of the bearing bush (40) or the chock (60), and
 in that at least one of the throttle elements (70, 71) has a flange (76) on a rear side that faces the chock, for engaging into the annular groove.

11. The roll assembly according to claim 1, characterized in that
 an oil collecting space (64) is formed between the chock (60) and the roll barrel (25), at an end (22) of the roll neck (20) that is distant from the roll barrel.

12. The roll assembly according to claim 1, characterized in that
 a neck bush (30) is disposed on the roll neck (20); and in that the neck bush is rotationally mounted with the roll neck in the receiving opening of the chock, or in a bearing bush if one is provided.

13. The roll assembly according to claim 1, characterized in that
 the annular gap (35) is embodied as having at least one peripheral annular channel (36, 36') in a region between the first and the second throttle ring (70, 71).

* * * * *